No. 729,272. PATENTED MAY 26, 1903.
C. E. BURNEY.
MANHOLE COVER.
APPLICATION FILED OCT. 4, 1902.
NO MODEL.
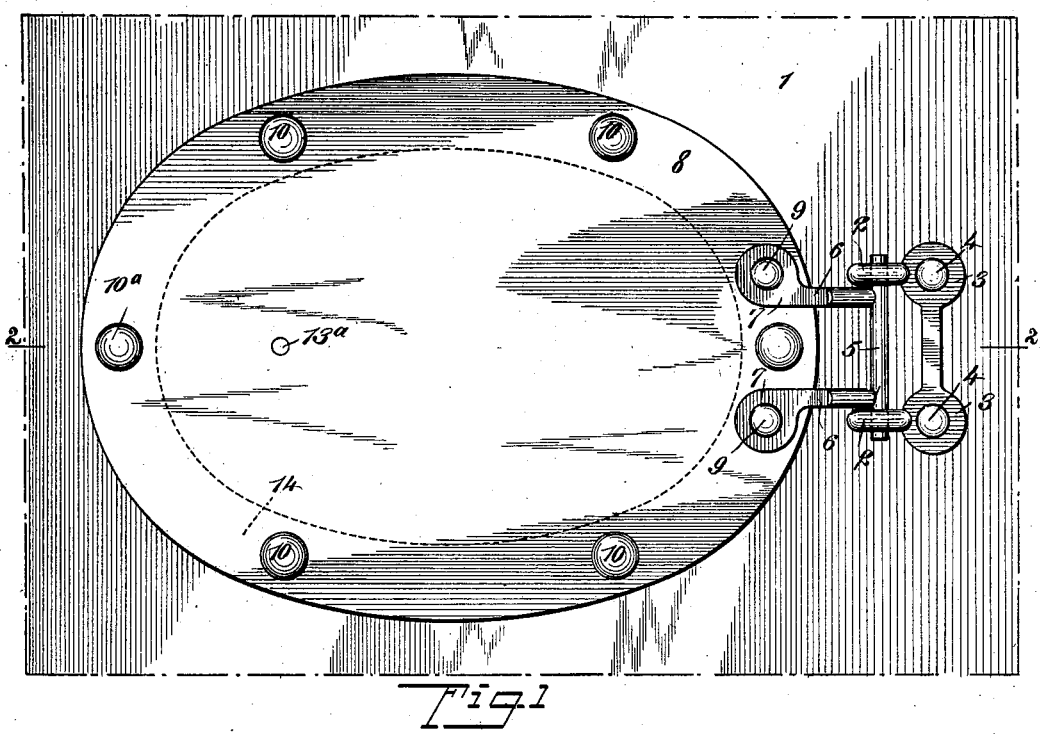
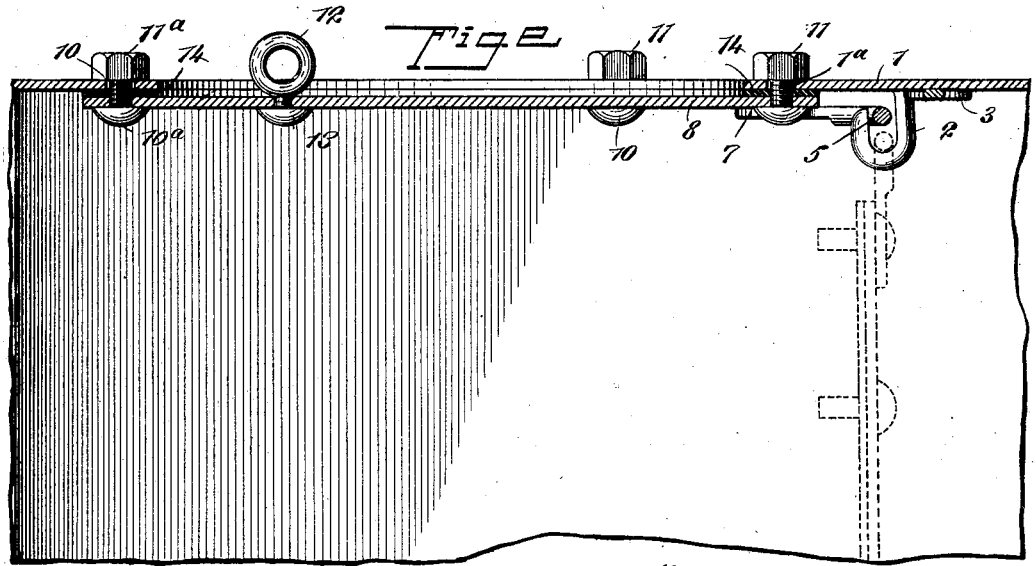
WITNESSES:
J. A. Brophy
W. Harrison
INVENTOR
Charles E. Burney
BY
ATTORNEYS.

No. 729,272.

Patented May 26, 1903.

UNITED STATES PATENT OFFICE.

CHARLES E. BURNEY, OF NEW YORK, N. Y.

MANHOLE-COVER.

SPECIFICATION forming part of Letters Patent No. 729,272, dated May 26, 1903.

Application filed October 4, 1902. Serial No. 125,954. (No model.)

*To all whom it may concern:*

Be it known that I, CHARLES EDWARD BURNEY, a subject of the King of Great Britain, and a resident of the city of New York, borough of Manhattan, in the county and State of New York, have invented a new and Improved Manhole-Cover, of which the following is a full, clear, and exact description.

My invention relates to manhole-covers admitting of general use, and more particularly of the type employed in that part of a ship known in marine parlance as the "tank."

I will describe a manhole-cover embodying my invention and then point out the novel features in the appended claims.

Reference is to be had to the accompanying drawings, forming a part of this specification, in which similar characters of reference indicate corresponding parts in all the figures.

Figure 1 is an inverted plan or bottom view of my invention in use. Fig. 2 is a section upon the line 2 2 of Fig. 1, and Fig. 3 is a fragmentary section upon the line 2 2 of Fig. 1 and showing the lid spaced from the casing.

Upon the casing 1 of the tank are mounted a pair of hooks 2 integral with a bracket 3, which is secured firmly in position by means of bolts 4. A hinge member 5, provided with arms 6, which are flattened into ears at 7, is provided for the purpose of engaging the hooks 2.

The lid of the manhole is shown at 8, and is secured to the ears 7 by means of bolts or rivets 9. Secured firmly to the lid 8 are the screw-bolts 10 $10^a$. These bolts are preferably threaded, as shown, and screwed permanently into the lid 8, and are provided with detachable nuts 11 $11^a$, as indicated in Fig. 2. An eye 12, serving as a handle, is mounted upon the bolt 13, which is secured within the bolt-hole $13^a$. The object of this handle 12 is to enable the lid to be readily swung by hand. A gasket 14, having substantially the same general outline as the lid 8, is fitted upon this lid and is free to engage the casing 1, as indicated more particularly in Figs. 2 and 3.

The operation of my device is as follows: Suppose all of the nuts to be removed and that the lid occupies its normal position. It will appear in the position indicated by dotted lines in Fig. 2. In order to close the manhole, an operator grasps the handle 12 and swings the lid 8 upward and to the left, so that the nut $11^a$ may be placed upon the extreme upper end of the threaded portion of the bolt $10^a$. One or two turns of the nut $11^a$ are then given, and the lid now occupies a position parallel with the casing 1. The other nuts 11 are then placed in position, as indicated in Fig. 3, and all of the nuts are gradually turned, so as to draw the plate closer to the casing 1. Before tightening the nuts 11 $11^a$ the operator may adjust the gasket 14 by means of his fingers. It is for this purpose that the lid 8 is caused to occupy the horizontal position mentioned. When the first bolt $10^a$ is engaged by its nut $11^a$, this bolt, together with the hooks 2, constitutes the entire support for the lid 8. The other nuts, 11, being applied immediately, however, the lid is raised clear of the hooks 2 and is spaced asunder from the casing 1, as indicated in Fig. 3.

I am aware that swinging manhole-covers have been heretofore used and that these covers are fastened by means of buttons, &c. With the use of these fastenings, however, it is impossible to adjust the gasket with any degree of satisfaction, and the fastening members do not admit of the precise action peculiar to my device—that is to say, by gradually tightening the nuts each a little at a time a more uniform pressure is produced and a more perfect water-tight joint is secured.

Very little manual labor and skill are necessary in the operation of my invention. By having the lid placed upon the lower side of the casing—that is, placed toward the water—comparatively little pressure is needed to hold the same in place, the idea being that if the manhole-cover were subjected to excessive water-pressure this pressure would serve to make the joint still tighter.

Having thus described my invention, I claim as new and desire to secure by Letters Patent—

1. The combination with a tank having a manhole and a plurality of bolt-holes disposed adjacent thereto, of a plurality of hooks rigidly mounted upon said tank and depending therefrom, a lid provided with a hinge member normally secured to said lid for connecting the same to said tank, a plurality of bolts permanently secured to said lid for engaging said bolt-holes, one of said bolts being free to coact with said hooks and said hinge member for the purpose of spacing said lid from said manhole while holding said lid substantially parallel therewith, and nuts for engaging said bolts.

2. The combination with a tank having a manhole and a plurality of bolt-holes disposed about the same, of a lid for closing said manhole, said lid being provided with screw-bolts for loosely engaging said bolt-holes, a loose pivotal connection between said tank and one edge of said lid, a gasket provided with holes for engaging said bolts and normally held thereby upon said lid, and nuts for engaging said bolts, the arrangement being such that said lid may be swung radially into a position substantially parallel with said tank and spaced therefrom while temporarily supported by said pivotal connection and one of said bolts, thus enabling said gasket to be adjusted relatively to said lid before said bolts are firmly secured.

In testimony whereof I have signed my name to this specification in the presence of two subscribing witnesses.

CHARLES E. BURNEY.

Witnesses:
WALTON HARRISON,
EVERARD BOLTON MARSHALL.